Jan. 12, 1943.  H. J. MURRAY, JR  2,308,097
SIGNAL CONTROL MEANS
Filed Jan. 27, 1939
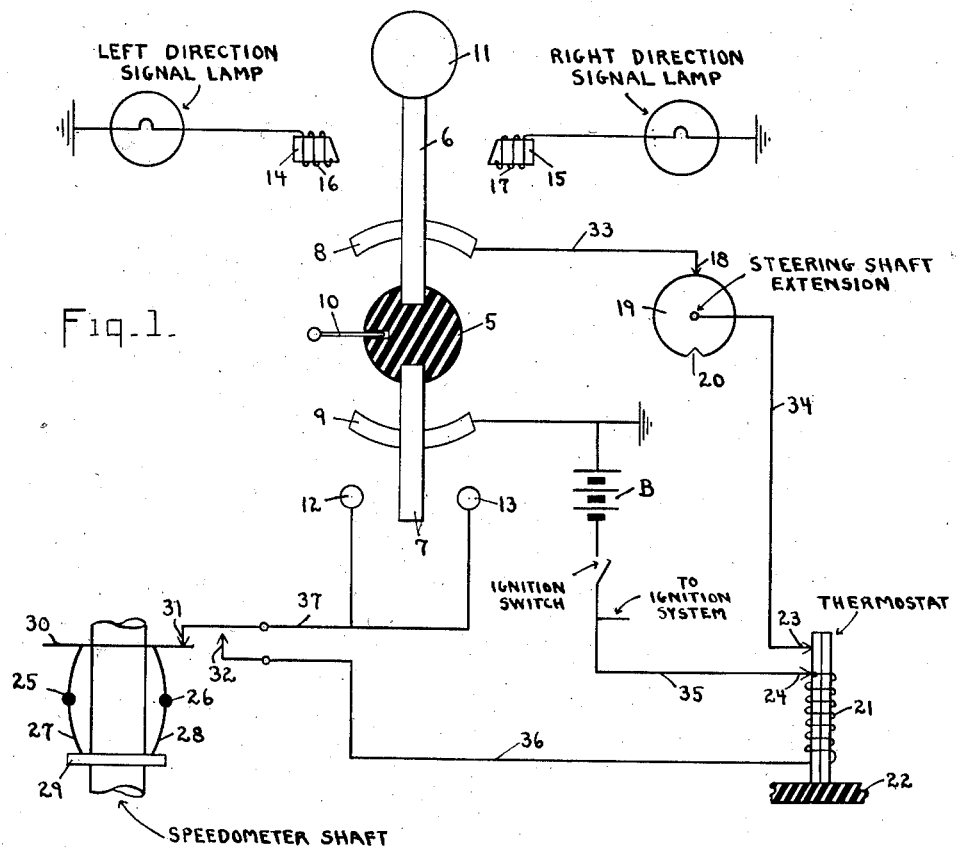
Fig. 1.
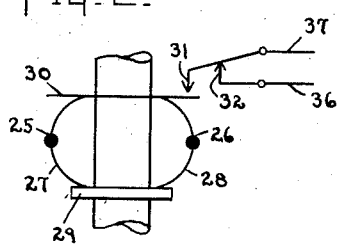
Fig. 2.
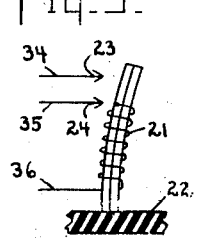
Fig. 3.
Fig. 4.
INVENTOR
Howard J. Murray Jr.

Patented Jan. 12, 1943

2,308,097

UNITED STATES PATENT OFFICE 2,308,097

SIGNAL CONTROL MEANS

Howard J. Murray, Jr., New York, N. Y.

Application January 27, 1939, Serial No. 253,115

8 Claims. (Cl. 177—339)

My invention relates to direction signalling systems for vehicles.

The use of a time-delay circuit control to automatically reset or deenergize a vehicle direction signal is well known in the art. One of the principal disadvantages in such an arrangement is that the circuit control may deenergize the signal at a time when it should indicate a turn, as for example when awaiting a change of traffic lights at a street intersection.

The use of steering gear controlled means to reset or deenergize a vehicle direction signal as a function of the operation of the steering wheel is also well known in the art. One of the principal disadvantages in this arrangement is that in case the turn is not actually made, due to change of intention on the part of the operator or otherwise, the signal will continue to be energized indefinitely in a misleading and dangerous manner unless manually terminated through actuation of the control switch or until some subsequent turn is made.

The ideal direction signalling system for use on a vehicle would combine both of the above controlling means, and in addition supply the former with further means for preventing its premature operation.

The present invention has as an object the provision of such a system. Through it the vehicle operator may indicate his intention of turning the vehicle. If the turn is made the indication will be terminated as a function thereof. If the turn is not made, and the control switch not reset, the indication will be terminated after a period of time. However, should the motion of the vehicle cease during this period, the termination of the indication will be postponed until after motion of the vehicle is resumed.

Another object of the invention is to provide a switch that operates after an approximately predetermined period of uninterrupted vehicle movement. However if the movement of the vehicle is interrupted during this period then the operation of the switch is postponed.

Additional objects will be apparent from the drawing.

Figure 1 shows diagrammatically one form of circuit incorporating my invention.

Figure 2 shows the position assumed by the elements associated with the speedometer shaft of Figure 1 when the latter is in a state of rotation.

Figure 3 shows the position assumed by the bimetallic thermostat of Figure 1 when it becomes heated.

Figure 4 shows the position assumed by the disc attached to the steering shaft extension of Figure 1 when the latter is rotated through an angle of approximately 180°.

In Figure 1 of the accompanying drawing is shown a battery or source of current B, an ignition switch, and a pair of single-filament electric bulbs constituting right and left direction signal lamps. Also shown is a pivotal ball 5 formed of insulating material and having positioned therein two switch arms or levers 6 and 7, the ball 5 being supported by some rigid part of the vehicle (not shown). A switch contact 8 is constantly in electrical engagement with the arm 6, and a contact 9 is similarly in engagement with the arm 7. The arm 7 selectively engages the additional contacts 12 and 13.

On the arm 6 is a handle 11 designed for manual actuation. A spring 10 holds the switch in neutral position as shown in Figure 1. A pair of magnet cores 14 and 15 are provided with windings 16 and 17 respectively.

Also illustrated is a steering shaft extension having an electrically conductive disc 19 securely attached thereto. A contact 18 frictionally engages the disc, which is formed with a niche or recess 20 therein. This steering shaft extension is insulated in some preferred manner from the steering shaft itself so as not to ground the direction signal circuit therethrough.

A bimetallic thermostat supported on the insulating base 22 is provided with a heating coil 21. A pair of contacts 23 and 24 engage the thermostat when the latter is not heated, as shown in Figure 1.

Also shown in Figure 1 is the speedometer shaft of the vehicle. Securely attached thereto by means of the collar 29 is a pair of spring elements 27 and 28 having weighted portions 25 and 26 respectively. Attached to the other end of the spring elements 27 and 28 is a disc 30 having an opening in the central portion thereof and designed to move axially along the speedometer shaft. This centrifugally operated assembly is similar in theory to conventional governors as employed on steam power plants.

A switch consisting of a flexible contact 31 and a rigid contact 32 is shown in open circuit position in Figure 1, the contact 31 being kept under tension and out of engagement with the contact 32 by the upward pressure of the disc 30 thereon, the centrifugal assembly being shown at rest. The disc 30 is formed of insulating material so as not to ground the circuit through the speedometer shaft.

The ignition switch is shown in the drawing to introduce a safety factor into the circuit. In the following description it is assumed to be closed.

With the vehicle at rest, the steering wheel set for straight forward travel, and the handle 11 in neutral, all of the elements will have the positions shown in Figure 1, and no current will flow.

If the handle 11 now be actuated against the tension of the spring 10, say for example to the left, current will flow through battery B, lead 35, contact 24, thermostat, contact 23, lead 34, disc 19, contact 18, lead 33, contact 8, arm 6, winding 16 to energize the left direction signal lamp. This flow of current will also magnetize the core 14, so that when the operator removes his hand from the handle 11 the latter will remain in left direction signalling position, the tension of the spring 10 being insufficient to overcome this magnetic pull on the arm 6.

While the spring 10 will not overcome the attraction of the magnets on the lever arm 6, nevertheless the handle 11 may be manually actuated at any time from either direction signalling position against such attraction.

If, with the handle 11 remaining in left direction signalling position as above described, the steering shaft be rotated through an angle of approximately 180°, the recess 20 will cause the circuit to be broken as shown in Figure 4. Breaking the circuit will cause the left direction signal lamp to be deenergized and the core 14 to be demagnetized. The spring 10 will consequently return the handle 11 to neutral position.

If desired, a pair of niches may be employed in the disc 19 to break the circuit after any turn of less than 180° in either direction. If a greater rotation of the steering shaft is desired before the circuit is broken, a different type of steering gear controlled switch may be utilized, such as that shown in Patent No. 1,889,551 to Hollins. Many controls are also shown in the prior art for breaking the circuit when the steering wheel is rotated to straighten out the vehicle after the turn is completed, any one of which may be substituted for the device illustrated.

Assume now that the handle 11 was actuated to left direction signalling position and then the steering shaft not rotated. The current flow described above would continue indefinitely, since with the vehicle at rest the circuit including the coil 21 would not be energized due to lack of engagement between the contacts 31 and 32. If, however, the vehicle begins to move, the centrifugal assembly assumes the position shown in Figure 2, the weighted elements 25 and 26 moving radially outward to draw the disc 30 down the speedometer shaft and out of engagement with the contact 31, which, having been under tension, now returns to normal position and engages the contact 32 as shown. The arm 7 being in engagement with the contact 13, current will flow through battery B, lead 35, contact 24, coil 21, lead 36, contacts 32 and 31, lead 37, contact 13, arm 7, contact 9 back to battery B to complete the circuit, and the coil 21 will be heated.

Continued heating by the coil 21 will cause the thermostat to assume the position shown in Figure 3. This will break both circuits, as both contacts 23 and 24 will be out of engagement with the thermostat. The spring 10 will return the handle 11 to neutral, and since the arm 7 is now out of engagement with the contact 13, cooling of the thermostat will not re-establish heating of the coil 21.

The contact 31 is out of engagement with the disc 30 during most of the time that the vehicle is in motion, minimizing wear of these elements.

The thermostat may be chosen so as to break the circuit after any desired time interval of heating, since this depends on the construction of the thermostat, the design of the heating coil, and the strength of the current. A variable resistance might advantageously be inserted in the heating coil circuit to more readily control this time interval.

While the centrifugally operated switch shown and described herein has been stated to be "off" when the vehicle is at rest and "on" when the vehicle is in motion, it is understood that such statement is not strictly accurate in that a very slight motion of the vehicle will not close the switch. The motion of the vehicle must be sufficient to rotate the speedometer shaft at a speed great enough to cause the centrifugal elements 25 and 26 to operate to move the disc 30 along the shaft. However, this fact will not be of importance in actual practice, as the centrifugal assembly may be so constructed as to operate at vehicle speeds of two or three miles an hour, or any other minimum speed desired, according to the design of the assembly. Or, to obtain a very low minimum speed of operation, the centrifugal assembly could be geared to the speedometer shaft so as to be rotated at several times the speed of rotation of the latter. In addition, it is understood that the centrifugal assembly has been shown attached to the speedometer shaft merely as an illustration, and that these elements could just as easily be attached to any other part of the vehicle that operates when the vehicle is in motion and does not operate when the vehicle is at rest, such as one of the wheels, the rear axle, or the propeller shaft.

It is likewise true that should the thermostat be heated to less than circuit-breaking temperature and then the motion of the vehicle cease, causing the thermostat to cool, the resumption of heating when the vehicle again moves will result in a period of time between such resumption and the instant of circuit-breaking the duration of which will vary and be indeterminable to a certain degree, varying between zero and the full predetermined period and being controlled by the temperature of the thermostat at the time heating ceased and also by the length of the cooling period. However, in actual practice the above will only mean that in special circumstances the direction signal may be indicated for the full predetermined period of time-delay control following a break in the movement of the vehicle, this "predetermined period" being the period of time-delay thermostatic control obtained with the thermostat heated without interruption, beginning at normal temperature.

Having thus described my invention, I claim:

1. On a vehicle; a source of current; a switch; a direction signal circuit including the switch and initially energized by the closing thereof; a thermostatic circuit breaker in said direction signal circuit designed to break said circuit when the breaker has reached approximately a predetermined temperature; electrical heating means for the circuit breaker; a second switch open only when the vehicle is at rest; and an additional circuit including the source of current, the said heating means, and both said switches.

2. On a vehicle; a source of current; a direction signal circuit including a manually operable switch and energized by the closing thereof; a normally closed electro-responsive time-delay circuit breaker in said direction signal circuit; a second switch closed only during movement of the vehicle; and a control circuit for the said breaker including both said switches.

3. On a vehicle; a source of current; a normally closed thermostatic circuit breaker having an approximately predetermined operating temperature; two electrical circuits each including the said breaker; said breaker when closed connecting both said circuits to the said source of current; a direction signal and a manually operable switch in one of the said circuits; and electrical heating means for the breaker, the said manually operable switch, and a second switch in the other of the said circuits, said second switch being closed only during movement of the said vehicle.

4. On a vehicle; a source of current; a manually operable switch; a direction signal circuit including the source of current and the switch and initially energized by the closing of the latter; a normally closed thermostatic circuit breaker in said direction signal circuit; an electrical heating coil for the breaker; a second switch closed during movement of the vehicle and open when the vehicle is at rest; and an additional circuit including the source of current, the electrical heating coil, and both said switches, the last mentioned circuit being energized only when both switches and the circuit breaker are closed.

5. On a vehicle; a source of current; a manually closable switch; a direction signal circuit including the switch and initially energized by the closing thereof; means for biasing the switch to open position; magnetic means energized as a function of the energization of the said direction signal circuit for holding said switch in closed position against the action of the said biasing means; a normally closed circuit breaker in said direction signal circuit; electrically operated time-delay means for moving the said circuit breaker to circuit-opening position; a second switch closed only during movement of the vehicle; and a second circuit including the source of current, the time-delay means and both said switches; said second circuit being energized only when both said switches are closed; whereby an opening of said circuit breaker through action of said time-delay means will result in a deenergization of said direction signal circuit, a deenergization of said magnetic means, and an opening of said first mentioned switch through action of the said biasing means.

6. On a vehicle; a source of current; a manually closable switch; a direction signal circuit including the switch and initially energized by the closing thereof; a normally closed electrically energized time-delay circuit breaker in said direction signal circuit normally energized as a function of the energization of the said direction signal circuit and designed to open and break said circuit normally after an approximately predetermined period of uninterrupted energization following the closing of said switch; an additional switch closed only during movement of the vehicle; and a control circuit for energizing the said breaker, said control circuit including both said switches and normally energized by the closing thereof; whereby an opening of said second mentioned switch during an energization of the said breaker will deenergize the said control circuit and delay the opening of the said breaker beyond the said approximately predetermined period.

7. On a vehicle; a source of current; a normally closed electrically energized time-delay circuit breaker; a manually operable switch; a direction signal circuit including the circuit breaker and the switch and initially energized by the closing of the latter; a second switch closed only when the vehicle is in motion; and a second circuit including both said switches and the said breaker, said second circuit designed when closed to energize said breaker; an opening of said breaker resulting in a deenergization of both said circuits.

8. In a vehicle directional signal system, a main circuit including in series a source of current, a normally open first switch means, a normally closed second switch means and a directional signal, the first switch means being manually closed to energize the signal, the second switch means having electrically-operated time-delay means for opening this second switch means after an approximately predetermined time interval of uninterrupted operation of the time-delay means, thus deenergizing the signal; a branch circuit connected to the main circuit in parallel with the signal when the second switch means is closed, this branch circuit including the time-delay means and a third switch means which is closed when the vehicle is in motion and open when the vehicle is at rest, the third switch means in the latter condition interrupting the branch circuit and the operation of the time-delay means, thus prolonging the interval of energization of the signal, by a period approximately equal to that during which the vehicle is at rest.

HOWARD J. MURRAY, Jr.